(12) United States Patent
Shamir

(10) Patent No.: US 11,436,496 B2
(45) Date of Patent: Sep. 6, 2022

(54) SYSTEMS AND METHODS FOR REGULARIZING NEURAL NETWORKS

(71) Applicant: Google LLC, Mountain View, CA (US)

(72) Inventor: Gil I. Shamir, Sewickley, PA (US)

(73) Assignee: GOOGLE LLC, Mountain View, CA (US)

(*) Notice: Subject to any disclaimer, the term of this patent is extended or adjusted under 35 U.S.C. 154(b) by 811 days.

(21) Appl. No.: 16/388,430

(22) Filed: Apr. 18, 2019

(65) Prior Publication Data

US 2019/0325313 A1    Oct. 24, 2019

Related U.S. Application Data

(60) Provisional application No. 62/660,617, filed on Apr. 20, 2018.

(51) Int. Cl.
*G06N 3/08* (2006.01)
*G06K 9/62* (2022.01)

(52) U.S. Cl.
CPC ......... *G06N 3/084* (2013.01); *G06K 9/6235* (2013.01); *G06K 9/6248* (2013.01); *G06N 3/082* (2013.01); *G06K 2009/6237* (2013.01)

(58) Field of Classification Search
CPC ...... G06N 3/084; G06N 3/082; G06K 9/6235; G06K 9/6248; G06K 2009/6237
See application file for complete search history.

(56) References Cited

U.S. PATENT DOCUMENTS

| | | | |
|---|---|---|---|
| 2015/0019463 A1* | 1/2015 | Simard | G06F 40/30 706/12 |
| 2017/0161640 A1* | 6/2017 | Shamir | G06N 20/00 |
| 2018/0121799 A1* | 5/2018 | Hashimoto | G06N 3/0454 |
| 2019/0147339 A1* | 5/2019 | Nachum | G06N 3/084 706/25 |
| 2019/0278600 A1* | 9/2019 | Frumkin | G06N 3/0472 |
| 2020/0134461 A1* | 4/2020 | Chai | G06N 3/088 |

OTHER PUBLICATIONS

Loshchilov, Ilya, and Frank Hutter. "Decoupled weight decay regularization." arXiv preprint arXiv:1711.05101 (2017). (Year: 2017).*

* cited by examiner

*Primary Examiner* — Fayyaz Alam
(74) *Attorney, Agent, or Firm* — Dority & Manning, P.A.

(57) ABSTRACT

The present disclosure relates generally to machine learning. More particularly, the present disclosure relates to systems and methods that regularize neural networks by decorrelating neurons or other parameters of the neural networks during training of the neural networks promoting these parameter to innovate over one another.

21 Claims, 6 Drawing Sheets

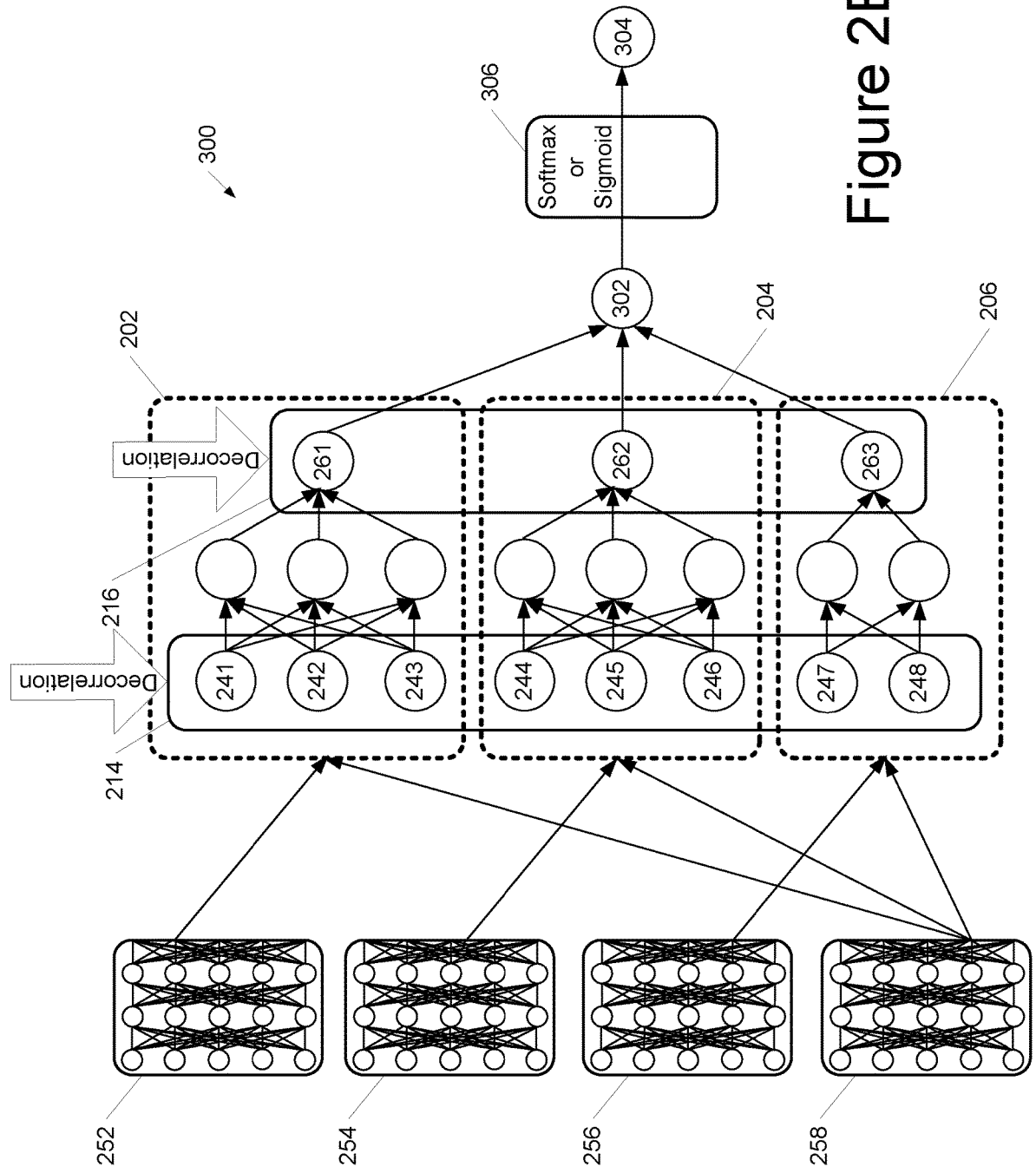

SYSTEMS AND METHODS FOR REGULARIZING NEURAL NETWORKS

RELATED APPLICATIONS

This application claims priority to U.S. Provisional Patent Application No. 62/660,617, which is hereby incorporated by reference in its entirety.

FIELD

The present disclosure relates generally to machine learning. More particularly, the present disclosure relates to systems and methods that regularize neural networks by decorrelating neurons and/or other components or parameters of the neural networks during training of the neural networks.

BACKGROUND

Neural networks have provided huge breakthroughs in prediction with big data and improved the prediction accuracies and capabilities of machine learning. However, due to the very large number of parameters that neural networks try to learn in order to achieve such performance, they can significantly overfit the training data, potentially resulting in poor generalization to data that was not observed during training.

Neural networks also suffer from potential instability in training and irreproducibility. For irreproducibility, for example, it is possible that independently training the same network structure twice on the same data can still result in two neural networks that are very different and that yield different predictions on data that was not observed during training. This can happen in highly parallelized and distributed training systems that do not guarantee that training examples are visited in the same order. Networks can then evolve very differently with covariate shifts if they then control which subsequent training examples are seen. These deviations can result from different random initializations, parallelization, and/or order of the training examples.

It has been shown that there is a large amount of redundancy in a neural network. The redundancy can lead to overfitting and to the other problems described above. Specifically, a network can be well overparameterized, where some parameters can be predicted by others. This specifically leads to overfitting with limited training examples, as a learning (regret) penalty is paid for more parameters than needed and the rate of convergence and the ability to generalize is slowed.

Thus, neural networks suffer from overfitting, potential poor generalization to unseen data, instability, and irreproducibility when retrained on the same data but with potential different initialization, parallelization and order of training examples. Such problems make it difficult, and sometimes impossible, to deploy large-scale systems using neural networks, causing huge losses because of the inability to utilize the significant benefits and advantages of neural networks in providing more accurate predictions. Current solutions require duplication in training and deployment, resulting in over-utilization of CPU and memory, and blocking the ability to deploy more systems due to lack of resources.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to train neural networks. The method includes obtaining, by one or more computing devices, data descriptive of a neural network. The neural network includes a plurality of layers of neurons. The method includes backpropagating, by the one or more computing devices, a loss function through the neural network to train the neural network. The loss function is descriptive of a performance of the neural network with respect to a set of training examples. Backpropagating, by the one or more computing devices, the loss function through the neural network includes, for each of one or more layers of the plurality of layers of the neural network: determining, by the one or more computing devices, a gradient of the loss function with respect to the neurons included in the layer. For at least the layer, the loss function includes an innovation loss term that provides, for each of one or more neurons or units included in the layer, a loss value that is based on an ability of one or more other neurons in the layer to predict a value of such neuron. Backpropagating, by the one or more computing devices, the loss function through the neural network includes, for each of the one or more layers of the plurality of layers of the neural network: modifying, by the one or more computing devices, the neurons included in the layer based at least in part on the gradient of the loss function that includes the innovation loss term to decorrelate the neurons included in the layer.

Another example aspect of the present disclosure is directed to a computer-implemented method to train neural networks. The method includes obtaining, by one or more computing devices, data descriptive of a neural network. The neural network comprising a plurality of layers of neurons. The method includes determining, by the one or more computing devices, for each of one or more neurons included in one or more of the plurality of layers, a benefit score based at least in part on an error of a prediction of a value of such neuron by one or more other neurons included in a same layer. The method includes modifying, by the one or more computing devices, a weight associated with at least one of the one or more neurons based at least in part on the benefit score determined for such at least one neuron.

In some implementations, modifying, by the one or more computing devices, the weight associated with at least one of the one or more neurons based at least in part on the benefit score comprises regularizing, by the one or more computing devices, the weight to zero when the error is less than a threshold value.

In some implementations, the method further includes after regularizing, by the one or more computing devices, the weight to zero, randomly re-initializing one or more links associated with the neuron.

In some implementations, for each of the one or more neurons, the error of the prediction of the value of neuron by the one or more other neurons included in the same layer comprises the error in an estimate of a full activated weight of such neuron from one or more regularized activated weights of the one or more other neurons included in the same layer.

In some implementations, modifying, by the one or more computing devices, the weight associated with at least one of the one or more neurons comprises modifying, by the one or more computing devices, the weight associated with at least one of the one or more neurons to a regularized value that is equal to a dot product of a Sigmoid function or hyperbolic tangent function applied to the benefit score for such neuron and the value of such neuron.

In some implementations, for each of the one or more neurons, the benefit score comprises: a cumulative square error on all batches and a current batch; an average per batch per example error; or a sliding or a decaying exponential window error over a set of recent batches.

Another example aspect of the present disclosure is directed to a computer-implemented method to train neural networks. The method includes obtaining, by one or more computing devices, data descriptive of a neural network. The neural network includes a plurality neurons respectively connected by a plurality of links. The method includes backpropagating, by the one or more computing devices, a loss function through the neural network to train the neural network. The loss function is descriptive of a performance of the neural network with respect to a set of training examples. Backpropagating, by the one or more computing devices, the loss function through the neural network includes, for each of one or more neurons, links, or biases of the neural network: determining, by the one or more computing devices, a gradient of the loss function with respect to the one or more neurons, links, or biases of the neural network. For at least the one or more neurons, links, or biases of the neural network, the loss function includes an innovation loss term that provides, for each of the one or more neurons, links, or biases, a loss value that is based on an ability of one or more other neurons, links, or biases to predict a value of such neuron, link, or bias. Backpropagating, by the one or more computing devices, the loss function through the neural network includes modifying, by the one or more computing devices, the one or more neurons, links, or biases of the neural network based at least in part on the gradient of the loss function that includes the innovation loss term to decorrelate the one or more neurons, links, or biases of the neural network.

In some implementations, the one or more other neurons, links, or biases of the neural network can be included in a same layer of the neural network as the one or more neurons, links, or biases they attempt to predict.

In some implementations, at least one of the one or more neurons, links, or biases of the neural network are included in a different layer of the neural network than the one or more neurons, links, or biases that such at least one neuron, link, or bias attempts to predict.

In some implementations, at least one of the one or more neurons, links, or biases of the neural network are randomly chosen for each training batch from the layer.

In some implementations, examples are mini-batch over training batches to compute innovation decorrelation losses.

In some implementations, input layer embeddings are initialized randomly or deterministically to nonzero values that promote decorrelation of layers and towers connected to them.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 2A-C depict example neural networks according to example embodiments of the present disclosure.

Figure 1A:
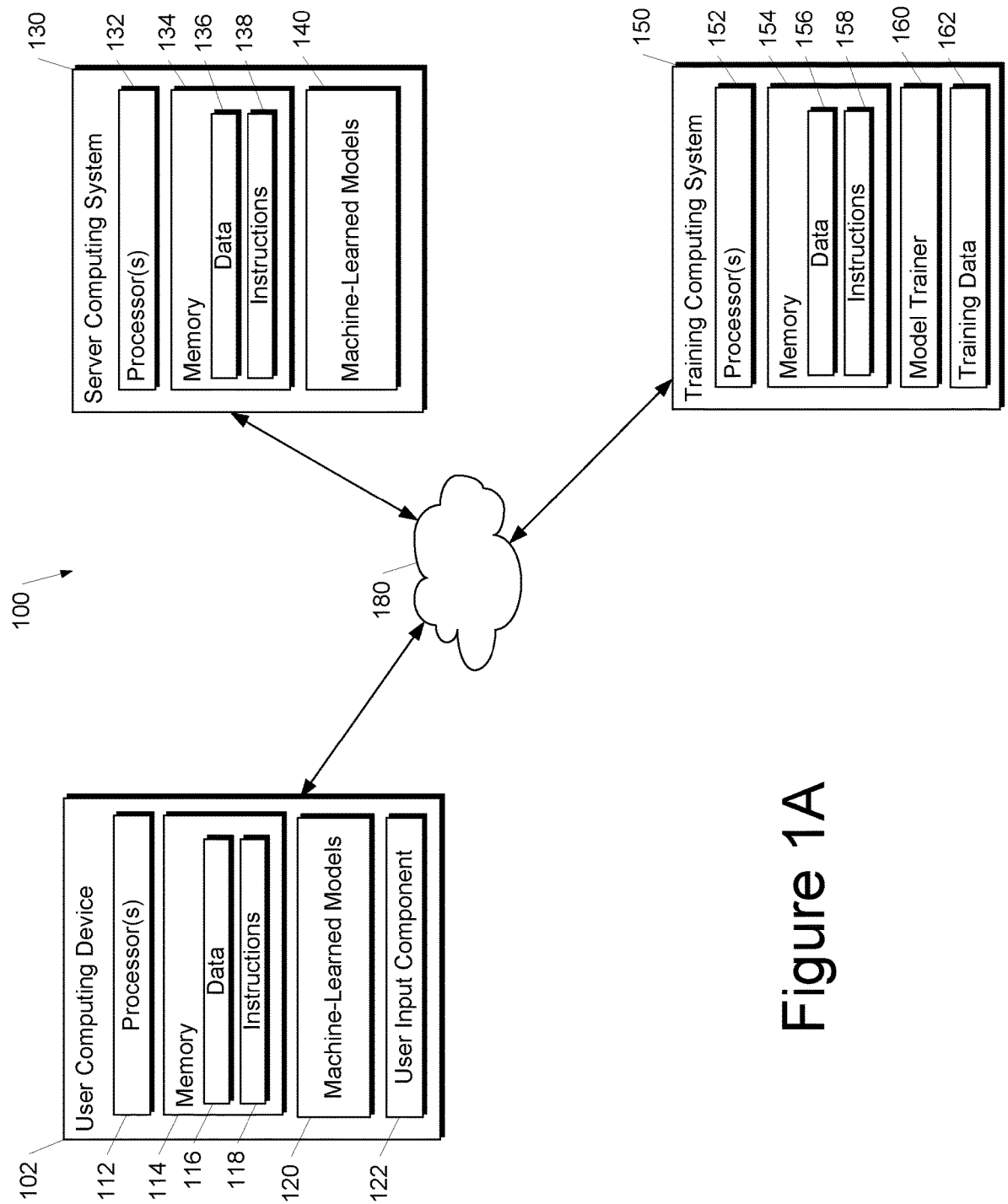
FIG. 1A depicts a block diagram of an example computing system that trains neural networks according to example embodiments of the present disclosure.

Reference numerals that are repeated across plural figures are intended to identify the same features in various implementations.

DETAILED DESCRIPTION

Overview and Introduction

Example aspects of the present disclosure are directed to systems and methods that regularize neural networks by decorrelating neurons or other parameters or components of the neural networks during training of the neural networks. In particular, the present disclosure provides a novel approach to decorrelate correlated neurons in a layer in a neural network (e.g., an output layer or a hidden layer). In some implementations, the systems and methods of the present disclosure can identify layer neurons that provide less added prediction value in the layer. neurons that can be well-predicted by other neurons of the layer add less predictive value to the network. Such neurons can be forced to move in a direction that increases their added value. This can be done by an additional loss that is injected into the layer of the neural network, such that the loss gradients on these neurons push neurons away from predicting each other.

Thus, in some implementations, the approaches described herein are not based solely on decorrelating pairs of neurons in the layer, but also on assuring that each neuron in a layer of a neural network is pushed towards innovating beyond the information of the other neurons in the layer. As one example, this can be done by assuring that the smallest mean square error of predicting the value of the given neuron by some or all of the other neurons in the layer is maximized. Variations of these example approaches can be implemented by imposing an additional per-layer regularizer loss that enforces such a constraint. As examples, the constraint can be imposed in the form of L2 regularization, as well as in the form of Lagrangian dual variable optimization. Thus, the present disclosure provides a number of strategies for measuring the innovation of a neuron, and applying a related loss to maximize it. A neuron can but does not necessarily include a non-linear activation. For example, neurons can include and implement linear or non-linear activation functions to provide a neuron output based on input values provided as input to the neuron.

Further, the present disclosure also demonstrates that, in addition to the example regularization-style and Lagrangian dual variable techniques, an additional technique that resembles Minimum Description Length (MDL) Regularization can also be implemented to instill neuron innovation. In particular, the innovation of a neuron (e.g., the additional dimension it brings over the value predicted to it by other neurons) can be utilized to scale the weight of the neuron up or down. In one example, if the neuron is innovative, its weight is not scaled down (or can be scaled up), while if it is not innovative, its weight is scaled down, allowing other neurons to take over, and, in some cases, forcing the neuron to be eventually regularized away.

Thus, the present disclosure provides systems and methods that can be used to regularize neural networks, thereby improving network reproducibility, generalization, and stability. As one example technical effect and benefit, resource savings can be achieved by eliminating the need for ensemble training, thereby saving RAM and CPU usage in deployment, ensuring faster training, and potentially also improving prediction accuracy. As another example technical effect and benefit, neural networks trained according to the systems and methods of the present disclosure exhibit reduced prediction biases and overfitting, resulting in better generalization to unseen data.

More particularly, consider a layer of a neural network (e.g., a hidden layer of a neural network). A given layer is supposed to hold all the information learned by the network because it acts as the bottleneck of the information from the input to the output. Due to overparameterization, some of the activated neurons can correlate with others. In other words, it may be possible to use a subset of the activated neurons in a layer to predict the other subset. If that is the case, spending learning loss on the neurons that are predictable can lead to slower convergence. This, in turn, can lead to overfitting and poor generalization, as well as irreproducibility and unstable networks. Specifically, such redundancy can increase the multiplicity of solutions, making the network less reproducible. The problem can be addressed in two directions: decorrelation; or forced correlation. The present disclosure provides systems and methods which employ the decorrelation approach.

Certain techniques add a layer loss applied on the activations of all neurons in a layer in the neural network, where the layer loss penalizes the layer for pairs of neurons that have high covariance. Thus, the layer loss operates on a pair-wise basis. Back-propagation of that loss reduces the covariances between such pairs. The overall layer objective is set to be the sum of squares of all covariances (or the square of the Frobenius norm of the covariance matrix) omitting the elements on the diagonal. Estimates of the covariances are obtained on a batch of training examples. Back-propagation applies the gradients on this additional loss. While this approach has merits, it treats the problem incompletely due to the following two reasons:

First, the covariance may not be the correct measure of how well a given neuron explains the other, as it omits the means of both neurons. Since there is typically not any other knowledge in the layer to utilize to predict the mean, some of the relation between the neurons in the layer may be lost by only looking at covariances. For example, two neurons can have (very large) equal expected values—one with large variance and the other with small—but in both cases the variance is much smaller than the mean. In addition, the covariance between the neurons is very small. One neuron can still predict most of the energy of the other, but covariance-based correlation will imply that this is not the case. Covariance constraints impose no constraints at all on the mean, so the means can vary widely. For example, if two neurons sum to 1 in the mean, their means can be any two values that sum to 1. When imposing covariance-only-constraints, the possibility of such multiple solutions that are different is not eliminated. Moreover, since activations in neural network are nonlinear, it cannot be expected that the activated neurons will have a mean of 0 over a batch. In fact, with ReLU, this is impossible, unless the neuron is not activated for any example in the batch. Covariance only constraint implicitly assumes a 0 mean.

Second, covariances or correlations only give the relation between two elements. Penalizing over sum of square covariances omits the relation between the other neurons. For example, if there are three linearly dependent neurons, for predicting the third one, both the first and the second will be penalized without considering the relations between them, instead of splitting the penalty between them. This can potentially overstate the penalty for some neurons while understating for others.

Aspects of the present disclosure address these two issues. In particular, in some implementations, instead of using covariance, the systems and methods of the present disclosure use correlation, as there is no estimator for the mean in the layer. One goal, then, is to essentially force the innovation of each neuron (e.g., the activation of each neuron) in a layer to be maximal relative to the information from the other neurons in the layer. Considering the information for an example in a given layer with n neurons is given by a point in an n-dimensional Euclidean space, the square error is a valid metric.

In order to maximize the innovation of an activated neuron (e.g., where activations can also be linear) relative to its peers, the systems and methods of the present disclosure can try to predict an activated neuron from the other activated neurons. The best predictor in terms of minimizing the mean square error on the example training batch is the conditional mean estimator. However, since it is difficult to compute it, in some implementations, the present disclosure can instead consider the best linear predictor. Because there is no other information in the layer that is used for optimizing the loss beyond the layer, in some implementations a homogenous linear estimator can be used. In other words, since the final objective only "sees" the activated neurons of the layer, nothing else should be used to determine if a neuron is innovative relative to all the other information units that propagate up to the final objective.

A first example strategy provided by the present disclosure is to predict each neuron in the layer using the homogeneous linear Minimum Mean Square Error (MMSE) estimator. This estimator gives a good estimate (given the computationally tractable constraints) for each activation from the other activations, given that the estimates for the statistical correlations and means are accurate. According to an aspect of the present disclosure, the goal in some implementations is to make the error of this estimator as large as possible; The larger the error the better the innovation of the neuron. The solution requires multiple inversions of large matrices. However, if this is intractable, the error minimization can be replaced by a potentially suboptimal regression based solution, proposed as a second example strategy.

A third example strategy provided by the present disclosure views the n neurons of the k examples in a training batch as n k-dimensional vectors of the neuron values for the k examples. The jth vector represents the state of the jth neuron on the k examples of the training batch. From each neuron vector, one can subtract its projections on the other n−1 vectors to produce a prediction error of predicting this vector by the other n−1 vectors. In other words, the error vector that is orthogonal to the other vectors can be produced. The norm of this vector is the prediction error for the batch. Again, one can attempt to maximize the square of this norm by, for example, backpropagating the gradient of its inverted value. Alternatively, one can minimize the norm of the projections of this vector onto the other vectors.

In the following sections the present disclosure describes the details of the strategies presented above. First, the present disclosure demonstrates examples of how decorrelation of neuron pairs can be applied. Next, the present disclosure demonstrates three example strategies to compute a maximum innovation-based Mean Square Error (MSE)-based objective for a network layer. Then, the present disclosure demonstrates two example approaches to apply this objective to a layer of the network: a regularization-like approach for enforcing the maximal-MMSE (innovation) constraint on a batch, and a variant that uses Lagrange-based constrained optimization. Next, it is described how the square error innovation estimator can be utilized to apply an online benefit based (MDL regularization-like) approach on a layer. Finally, some practical complexity issues are addressed and several ideas on how to apply the techniques in practical systems are presented.

Thus, approaches based on the innovation or mean square error in predicting layer neurons by the other neurons in the layer are provided herein. One underlying idea is that if a neuron can be predicted from the other neurons in the layer with an error with small magnitude, the neuron is likely redundant. Methods to decorrelate the neuron are proposed by pushing the gradient over the neuron to increase its innovation over the other neurons. Alternatively, regularizing the neuron away if it is not innovative using a benefit score based approach, where the score is tied in to the innovation of the neuron is proposed.

Although portions of the discussion herein focuses on neurons within a hidden layer, the innovation regularization techniques described herein can be performed in any layer. It may be sufficient to perform the techniques on the top and/or bottom layers, but there are no restrictions not to include more layers, other than increased computational costs. For example, computational costs of performing the techniques may make it desirable to implement it only on the top layer for complexity reduction. However, it may be beneficial to impose it on other layers as well. Thus, unless specified otherwise, any reference to a layer in the present disclosure includes input layers, hidden layers, and output layers (e.g., including layers consisting of single neurons each heading a component (e.g., tower) of a full network) within its scope.

In addition, although the discussion focuses on neural networks, the approaches herein (e.g., the approaches that decorrelate with MSE) are more general than just for neural networks. They can also be applied to find correlations among features in linear models. Specifically, in some implementations, they can be applied only on the subset of features present in batch updates of linear models, instead of over the whole feature set.

Furthermore, while the approach is often described on the activated neurons of a layer, it is possible to apply it on the pre-activated neurons, links, biases or other parameters or aspects of the neural network. Since it is desirable to measure the innovation of the layer at the point closest to the final output, and because the effect on the final objective is the ultimate concern, it is reasonable to apply the constraint post-activation. However, if many neurons do not activate, it may not be very beneficial, and applying the approach pre-activation is also possible. Likewise, the approaches described herein can be applied on linear activations in addition or alternatively to non-linear activations. In addition, the approach can also be applied on other components and links or any parameters in the network. Specifically, in some implementations, it can be applied across layers to different neurons. However, the approach primarily contemplated by the present disclosure is to apply it within complete layers, as a layer should capture all the information from the layers and neurons below it, and relay that (compressed) information up to the objective.

In some implementations, the proposed method can be applied specifically to the layer closest to the output in ensemble model structures. One example of such a constellation consists of several separate networks, each of which has a single neuron at the output. The additional innovation loss can be applied to the layer of output neurons combining the components of the ensemble, but forcing each separate ensemble component to be different from one another and innovate over the other networks.

In some examples, where inputs are represented by features that are encoded into embeddings, innovation of neurons, or components of the network can be encouraged by enforcing different random initializations to the input embeddings to duplicate ensemble components of the network.

The systems and methods of the present disclosure provide a number of technical effects and benefits. As one example technical effect, the systems and methods of the present disclosure enable generation of neural networks or other machine-learned models that exhibit less overfitting and better generalization to unseen data, stability, and reproducibility. Thus, the systems and methods of the present disclosure enable generation of machine-learned models that exhibit superior performance relative to the state of the art. Furthermore, the systems and methods of the present disclosure may enable faster convergence of neural networks as, in some implementations, neurons are pushed at each round of training to innovate over their peers.

As another example technical effect, the systems and methods of the present disclosure enable improved utilization of processing and memory resources. More particularly, certain existing techniques that attempt to address overfitting, poor generalization, instability, and/or irreproducibility rely upon the performance of ensemble approaches. These ensemble approaches require duplication of multiple networks (that can be large scale) in both training and deployment. This training and deployment of duplicate or redundant networks greatly increases the consumption of both processing and memory resources. Thus, by providing solutions that address overfitting, poor generalization, instability, and/or irreproducibility without reliance or with less reliance upon the performance of ensemble approaches, the systems and methods of the present disclosure free up significant amounts of processing and memory resources which would otherwise be dedicated to such ensemble approaches. Alternatively, if similar ensemble structures are maintained, innovation encouraging methods can rely on the ensemble to promote better reproducibility.

Decorrelation

Consider a layer of a neural network with n neurons. The network trains on batches of k examples each. Let Z denote an n-dimensional random column vector representing the activations of the neurons at the end of the layer for some example. The correlation matrix of the layer is given by $$C_z = E[ZZ^T]$$

where the superscript T denotes the transpose operator. We can use the empirical estimate for the i, j element of the correlation matrix $C_z$ in the current training batch $$C_{z,i,j} = \frac{1}{k} \sum_{\ell=1}^{k} z_i^\ell z_j^\ell.$$

For these estimates to be valid, we should have sufficiently more examples in a batch than the number of neurons in the layer, i.e., k>>n. Throughout the present disclosure, the following notation convention will be used. Subscripts represent the indices j of activated neurons (or layer neurons) where $1 \leq j \leq n$. Multiple (two) subscripts i, j denote the relation between two such neurons. Superscripts l, where $1 \leq l \leq k$, denote indices of examples in a training batch.

According to an aspect of the present disclosure, a constraint can be imposed on the sum of squares of correlations in a layer, by adding a layer loss, such as the following example layer loss:

$$\mathcal{L}_{DeCor} = \frac{1}{2}[\|C_z\|_F^2 - \|\text{diag}(C_z)\|_2^2]$$

where $\|C_z\|_F$ denotes the Frobenius norm of $C_z$, and diag represents the diagonal elements of the matrix. Note that this loss can be normalized by the number of neurons n. Adding a regularizer weight $\lambda$ and propagating the gradient of this loss superimposed with the overall objective down from the activations of the neurons in the given layer, can enforce regularization that will decrease the magnitudes of correlations between pairs of activations in the layer. This addresses the fact that a similar approach with covariances does not account for correlations in the means of the activations.

The approach above can be extended such that the correlation is continuously updated throughout training instead of recomputed every batch. One implementation for this can use a form of an exponentially decaying window over batch, that multiplies the value computed earlier by a small positive constant (e.g., less than 1), and add the computed correlation for the current batch with another constant smaller than 1.

Alternative Approaches

The decorrelation method presented above uses decorrelation or de-covariance between the layers or component outputs over a training batch. Other losses can generate similar effects to decorrelation. A loss which can be referred to as an anti-distillation loss can be used to push outputs away from one another, such as an $L_2$ loss, $$\mathcal{L}_{anti} = \frac{1}{n^2 - n} \sum_{i,j:i \neq j} \frac{1}{k} \sum_{\ell=1}^{k} (z_i^\ell - z_j^\ell)^2$$

Other losses that force predictions to differ may be possible as well.

Correlation and covariance losses can be modified to eliminate duplicate losses that are caused because the component outputs are correlated beyond the pairs. Reducing correlation between outputs a and b and between outputs a and c may double count the correlation between a and the correlated components of b and c. To eliminate this double counting, Gram-Schmidt orthonormalization can be performed over the components $Z_i$ to generate a basis for the batch vectors. Instead of adding decorrelation losses between the vectors $Z_i$, decorrelation losses can be added between $Z_i$ and $B_j$ for $j<i$, where $B_j$ is the basis vector produced at step j of the Gram-Schmidt orthonomalization. Imposing loss only on these correlations, will ensure that each additional step tries to eliminate only projections (or correlations) that were not eliminated by previous steps.

Instilling Innovation in a Layer

MMSE Estimators

To address the maximization of the innovation of each activated neuron (under feasible linearity constraints), we derive the linear MMSE estimator of the jth layer neuron $Z_j$ from the n−1 dimensional vector of other neurons, denoted by $Z_{-j}$. Again, in order for the estimates of the correlations to be valid, the batch size should be large enough relative to the number of neurons, i.e., k>>n. Let $C_{z;-j}$ denote the $(n-1) \times (n-1)$ dimensional correlation matrix that results from dropping the jth row and the jth column from $C_z$. Let $$b_j = E[Z_j Z_{-j}]$$

be the n−1 dimensional cross correlation vector between the jth neuron and all the other neurons of the layer. Note that $b_j$ equals the jth column of $C_z$, with the jth element omitted. Then, the (homogeneous) linear MMSE estimator of $Z_j$ from $Z_{-j}$ is given by $$\hat{Z}_j = a_j^T \cdot Z_{-j}$$

where $$a_j = (C_{z;-j})^{-1} \cdot b_j.$$

The error in estimating $Z_j$ for example l in the batch is given by $$e_j^l = z_j^l - a_j^T \cdot z_{-j}^l$$

where lower case letters are used to denote instantiation values of the random variables. Estimation can be done per example, where the superscript l denotes the index of the example in the batch. The average batch error is given by $$\overline{e}_j = \frac{1}{k} \sum_{\ell=1}^{k} e_j^\ell.$$

The mean batch square error is given by $$\overline{e_j^2} = \frac{1}{k} \sum_{\ell=1}^{k} (e_j^\ell)^2.$$

The squared mean batch squared error $$\overline{\overline{e}}_j = \sqrt{\overline{e_j^2}}.$$

The expected MSE can also be computed directly from the correlations. It is given by $$E[E_j^2] = EZ_j^2 - a_j^T \cdot b_j.$$

Using this expression, we do not need to compute the error for each example in the batch. Instead, we estimate the correlations from the batch, invert the matrices $C_{z;-j}$, and compute the MSE for the batch with this equation.

To avoid possible singularities, if we have neurons that are not activated during the batch or are activated for a very small fraction of the batch, we may exclude them from the prediction and the additional propagated loss.

Inverse Innovation Loss:

The layer loss in a training batch is a superposition of the losses on the neurons and examples on the batch $$\mathcal{L} = \frac{1}{n} \sum_{j=1}^{n} \frac{1}{k} \sum_{\ell=1}^{k} L_j^\ell = \frac{1}{n} \sum_{j=1}^{n} L_j.$$

The loss can be normalized per example and per layer neuron. However, it is possible that this may not be necessary. Regardless, the normalization or lack of it can be absorbed in a regularization scale factor λ that can be added to this loss when combined with the objective loss of the network. The loss can be decomposed per example per neuron, as well as per neuron only.

The innovation loss is designed to push the network to maximize the innovation of each of the neurons in the layer. This implies that the (minimal) mean square prediction errors should be maximized. To superimpose this constraint with the network loss, which is minimized, one can convert the notion of the error to a loss that can be minimized. Imposing a negative batch mean square error loss would satisfy this requirement. However, such a loss is not convex (it is concave). Therefore, the gradient of the loss is 0 where the MSE is 0. Around 0, it has very small magnitude. The region where the MSE is close to 0 is where we need a large gradient to push the neuron faster to innovate on the other neurons.

Instead of negating the MSE, in some implementations, we can have a loss which inverts the MSE. This loss does provide a large gradient at the 0 region. We can dampen the loss by adding a positive term $\beta$ to the denominator to cap the gradient at 0 MSE, that without this term would be infinite. This leads to the following loss $$L_j^\ell = \frac{1}{2} \cdot \frac{1}{(e_j^\ell)^2 + \beta}$$

for the jth neuron on the lth example. The coefficient ½ is added for numeric convenience to cancel out the 2 term in the gradient. (It eventually is offset by a regularization factor λ that will be added.) The layer loss is given by $$\mathcal{L}_{MSE} = \frac{1}{n}\sum_{j=1}^{n}\frac{1}{k}\sum_{\ell=1}^{k}\frac{1}{2} \cdot \frac{1}{(e_j^\ell)^2 + \beta}$$

The gradient of the loss per-neuron per-example with respect to (with respect to) the ith neuron in example l is given by $$\frac{\partial L_j^\ell}{\partial z_i^\ell} = -\frac{e_j^\ell}{[(e_j^\ell)^2 + \beta]^2} \cdot \begin{cases} 1 & j = i \\ -a_{j:i} & i < j \\ -a_{j:i-1} & i > j \end{cases}.$$

Note that this gradient is of the loss per neuron j in example l relative to any neuron in the layer (including the jth one). We use $a_{j;v}$ to denote the vth component of the n−1 dimensional vector $a_j$. The distinction between the last two regions is simply because of the component shift up by removal of the jth component in $Z_{-j}$.

We note that the gradient pushes the weights of neurons that are non-innovative away from the correlated estimator based on the other neurons. However, it also pushes the neurons in the estimator to the opposite direction away from the estimated neuron. This can potentially impair the other neurons. It may, in some implementations, be more desirable to allow moves only of the predicted neuron, and not of the predicting neurons. This can be imposed by stopping propagation of gradients on the ith neurons, where i≠j. However, it may not be necessary. The alternative benefit score (MDL regularization) based approach, presented below may address this concern.

If we have very correlated neurons (at the extreme, equal neurons) i and j, the gradients of the innovation loss of one neuron i on both will negate those of the other j on both, and they may never move out of this correlated state. To address issues like this, in some implementations, we may prioritize among the neurons. One approach for that is by assigning different regularization coefficients to the loss of each of the neurons to avoid such issues. However, we can randomly assign the inverse of the ratio of correlation between the neurons, which can produce the same problem. This can be addressed by randomly perturbing the regularization coefficient between batches. This topic is discussed in more detail when we describe how to impose the layer loss on the network with regularization. Again, the benefit score (MDL regularization)-based approach, described at the end, may be more robust to issues like this.

Alternative Innovation Losses:

As alternatives to the inverse MSE loss, decreasing functions of the MSE with positive target values may also be used, as long as they satisfy the convexity requirements, and achieve maximal gradients at the region of 0 MSE. Unfortunately, an exponential decay with respect to the square error suffers from the same issues as negating the MSE (0 gradient with respect to the unsquared error at 0 square error). However, functions decaying with respect to the square root of the MSE satisfy these requirements, and can be used. Two such losses are the inverse loss with respect to the $L_1$ norm of the error given by $$L_j^\ell = \frac{1}{|e_j^\ell| + \beta}$$

where, again, $\beta$ is used to dampen the function to avoid an infinite gradient at 0. Alternatively a Laplace loss $$L_j^\ell = \exp(-\alpha|e_j^\ell|)$$

with parameter $\alpha$ can be used.

Batch Square Errors:

The loss $L_j$ for predicting neuron j from the other neurons was decomposed over the examples in the batch. However, the statistical correlations for this approach are estimated by all examples in the batch. It is also reasonable to consider the loss in aggregate over the examples. Unlike linear regression, the gradients are no longer linear in the error term. Computing expectation of the error or the square error over the batch, and using the expected values in updates would lead to different batch gradients.

Using the expected error with the dampened inverse square loss (instead of applying expectation on the losses over the batch as described before), the aggregate loss over all neurons is given by $$\mathcal{L} = \frac{1}{n}\sum_{j=1}^{n}\frac{1}{2} \cdot \frac{1}{\bar{e}_j^2 + \beta}.$$

The per-neuron loss is $$L_j = \frac{1}{2} \cdot \frac{1}{\bar{e}_j^2 + \beta}.$$

Differentiating with respect to neuron j of example l, $z_j^l$, $$\frac{\partial L_j}{\partial z_j^l} = -\frac{\frac{1}{k}\bar{e}_j}{(e_j^2+\beta)^2} = -\frac{\frac{1}{k^2}\sum_{\ell=1}^{k} e_j^\ell}{(\bar{e}_j^2+\beta)^2}.$$

Summing over all examples in the batch $$\sum_{\ell=1}^{k}\frac{\partial L_j}{\partial z_j^\ell} = -\frac{\frac{1}{k}\sum_{\ell=1}^{k} e_j^\ell}{(\bar{e}_j^2+\beta)^2} = -\frac{\bar{e}_j}{(\bar{e}_j^2+\beta)^2}.$$

The resulting gradient over all examples in the batch equals the gradient over the expected error in the batch. When we decompose over examples, the sum of gradients over the batch is the expectation of the same function $$f(x) = -\frac{x}{(x^2+\beta)^2}.$$

For positive and large enough $\chi$ and for small enough $\beta$, the magnitude of this function is convex. Thus by Jensen's inequality, the gradients computed per example would likely lead to bigger gradient steps (if they are all in the same direction). Similarly, for large enough negative values, the same would happen in the opposite direction.

The gradient of $L_j$ with respect to $z_i^l$ for some $i \ne j$ is expressed, similarly to the per-example gradients, by the gradient with respect to j multiplied by the factor $-a_{j;i}$, or $-a_{j;i-1}$ for i<j and i>j, respectively, Using the expected square error with the dampened inverse square loss, the aggregate loss over all neurons is given by $$\mathcal{L} = \frac{1}{n}\sum_{j=1}^{n}\frac{1}{2}\cdot\frac{1}{\bar{e}_j^2+\beta},$$

The per-neuron loss is $$L_j = \frac{1}{2}\cdot\frac{1}{\bar{e}_j^2+\beta}.$$

Differentiating with respect to neuron j of example l, $z_j^l$, $$\frac{\partial L_j}{\partial z_j^l} = \frac{\frac{1}{k}\bar{e}_j}{(\bar{e}_j^2+\beta)^2}.$$

Summing over all examples in the batch $$\sum_{\ell=1}^{k}\frac{\partial L_j}{\partial z_j^\ell} = -\frac{\frac{1}{k}\sum_{\ell=1}^{k} e_j^\ell}{(\bar{e}_j^2+\beta)^2} = -\frac{\bar{e}_j}{(\bar{e}_j^2+\beta)^2}.$$

Since $EX^2 \ge (EX)^2$, the magnitude of the gradient for the MSE over the batch is smaller than that for the mean error over the batch, which is smaller (under the conditions mentioned) than that aggregated over the gradients of the examples over the batch.

Again, the gradient of $L_j$ with respect to $z_i^l$ for some $i \ne j$ is expressed, similarly to the per-example gradients, by the gradient with respect to j multiplied by the factor $-a_{j;i}$, or $-a_{j;i-1}$ for i<j and i>j, respectively.

Using the gradient of the expected mean square error can be a natural fit if we directly compute the MSE or for innovation through projection presented later.

Gradient Descent Regression Estimators

The set of n MMSE estimators in a layer of n neurons requires inverting the n (n−1)×(n−1) dimensional correlation matrices $C_{z;-j}$. In some cases, this may be too computationally intensive. As an alternative, the least squares linear regression problem can be solved with square loss $$\mathcal{L}_{Regression} = \sum_{j=1}^{n}\sum_{\ell=1}^{k}(z_j^\ell - a_j^T\cdot z_{-j}^\ell)^2$$

with respect to the vectors $a_j$ during a training batch. This can be done performing a number of iterations of batch gradient descent over the batch. It can be done for all n neurons. While we can iterate enough times to guarantee convergence to the solution, we can also perform this for a small fixed number of iterations for some possibly suboptimal solution. Then, this solution can be used to compute the loss and gradients to propagate down from the layer, instead of the MMSE. The remaining steps, after minimizing the error with respect to $a_j$, will now minimize the inverted error loss as presented for the MMSE. The incomplete regression could result in some suboptimal minima on which the maximization of the error is now performed. Incomplete minimization in the first step may overstate the innovation of neurons. While suboptimal, it could still perform a sufficient level of regularization but with a more feasible, less computation intensive, approach.

If we can utilize additional storage of $O(n^2)$ per layer, we can perform several iterations of gradient descent in a given batch to improve the coefficients of the estimators $a_j$. We then store the state of the coefficients $a_j$, and warm start the next iterations with the stored values at the next batch. This can improve the results and make the vector $a_j$ approach its value that achieves the MMSE at the expense of additional storage space.

Batch Innovation through Projection

For the projection based approach, we should have k≥n, i.e, we should have at least as many examples in the batch as neurons in the layer. Otherwise, the dimensionality of the space spanned by the layer's neurons is bounded by k, which is smaller than the number of neurons in the layer.

To present the projection based approach, we need to transpose the notation defined before between the n neurons representing the dimension of the layer and the k examples. Let $$x_j = (z_j^1, z_j^2, \ldots, z_j^k)^T, \ 1 \le j \le n$$

be a column vector representing the k values of neuron j for the k training examples in the batch. Define the k×n dimensional matrix $$X = [x_1, x_2, \ldots, x_n]$$

as the concatenation of the column vectors of the layer neuron values over all layer neurons. Let $$B_{-j} = [b_{-j;1}, b_{-j;2}, \ldots, b_{-j;n-1}]$$

be a k×(n−1) dimensional matrix, whose columns are basis vectors that span the space spanned by the columns of X omitting the jth column. The columns of $B_{-j}$ can be obtained by performing Gram-Schmidt orthonomialization on the columns of X excluding the jth column. The actual columns of $B_{-j}$ will depend on the order in which the Gram-Schmidt process will be performed on the columns of X, but this does not affect the actual projection error we are interested in. The complexity of this process is discussed at the end of this section.

Now, we need to compute the error of projecting the vector $x_j$ on the space spanned by $B_{-j}$ for all j, $1 \le j \le n$. This error is given by $$e_j = x_j - \sum_{i=1}^{n-1} \langle x_j, b_{-j,i} \rangle \cdot b_{-j,i}$$

where $\langle (x_j, b_{-j,i}) \rangle$ is the inner product between the two vectors. The lth component of $e_j$, $e_j^l$, is the error component for example l. The error $e_j$ gives the portion of $x_j$ that cannot be explained (or predicted) by the other n−1 vectors $x_i$, i≠j. In other words, the error is the vector of difference values over the k training examples in the batch between the values of the jth layer net and their predictions by the other n−1 neurons of the layer.

The MSE for neuron j over the batch is given by the normalized (e.g., per example) square norm of $e_j$ $$\overline{e}_j^2 = \frac{1}{k} e_j^T e_j,$$

Due to the projection process over the full batch of examples, expressing the loss objective with respect to the batch mean square error appears to be the natural approach here. Thus we define the layer loss as $$\mathcal{L}_{Projection} = \frac{1}{n} \sum_{j=1}^{n} \frac{1}{2} \cdot \frac{1}{\overline{e}_j^2 + \beta}.$$

The gradients with respect to $z_i^l$ can be derived by following the linear steps of the derivation of the loss (including the generation of the basis matrix $B_{-j}$ for every j).

We can also define the loss per example using the equations for the similar losses with the MSE strategy. The error $e_j^l$ corresponding to the respective element in $e_j$ can be plugged into the equations. The gradient, again, can be derived from the linear steps performed to attain $e_j^l$.

The generation of the matrix $B_{-j}$ requires incrementally projecting each of the n−1 vectors from X onto the already formed columns of $B_{-j}$, subtracting the projections from the vector and normalization of the residue into a new column of $B_{-j}$. Projecting $x_j$ onto the basis require another n−1 projections (multiplications). Each projection is O(k) multiplication operations. For the full process there are O(1+2+3+ . . . +n−1)=O($n^2$) projections/normalization steps. Therefore, the complexity of projecting one vector j into the basis created by the other vectors is O(k$n^2$) multiplications. If we perform this for every j, we would need O(k$n^3$) multiplications.

This complexity can be reduced by sharing some of the basis vectors created. Instead of storing O(nk) elements (O(n) basis, each of k elements) at any given time, we can store O(nk log n) elements, and perform only O(k$n^2$ log n) operations. We split the set of vectors $x_j$ into two equal (or almost equal size) sets. For each set, a basis is generated, The concatenation of n basis vectors formed for both sets are stored. Then, each set is split in half again. Let A be the original top half, and B the original bottom half. The original vectors of A are now split in half into sets $A_1$ and $A_2$, and those of B into sets $B_1$ and $B_2$. For each of the sets $A_v$ we continue the Gram-Schmidt process (separately between the sets) over the basis vectors formed for set B. Similarly, this is done for $B_v$ with the basis formed for A. This process is repeated recursively, until each remaining set has a single vector. For each of these single vectors, its sibling from the previous step is now projected onto the basis consisting of the vectors in the sets over the path to this single vector to produce the error. This process has O(log n) steps, each step has O($n^2$) projections, each taking O(k) operations.

Alternative Projection Loss

Instead of using projection error and minimizing a loss that is inversely proportional to the error, we can directly minimize the energy of the projection of any vector on the space spanned by the others. We can perform Gram-Schmidt orthonormalization over the components $x_j$ to generate a basis for the batch vectors. Instead of adding decorrelation losses between the vectors $x_j$, we will add decorrelation losses between $x_j$ and the columns of $B_{-j}$, where $B_{-j}$ is the basis matrix as defined above. The loss for $x_j$ will be imposed on the energy of the projection from $x_j$ to all columns of $B_{-j}$. Imposing loss only on these correlations, will ensure that each additional step tries to eliminate only projections (or correlations) that were not eliminated by previous steps. If the loss is imposed on both $x_j$ and the columns of $B_{-j}$, and the gradients are allowed to back-propagate to both vectors, we can reduce the complexity of the process and perform it only on columns i such that i<j for every j. This allows building a single matrix B to account for all correlation, but may suffer for compensating multiple times for the same correlations.

Imposing Layer Innovation on the Network

It will now be shown how the layer innovation decorrelation constraints can be imposed on the neural network updates during back-propagation. These methods apply to any of the innovation loss computation strategies, presented above.

Innovation Instillation as Regularization

One approach to impose the layer innovation loss constraint in training the network is as a form of $L_2$ like regularization. During back-propagation, when entering the layer from the layer above, the loss seen by the layer is the sum of the loss coming from above (full objective plus potentially regularization losses from other layers) and a scaled version of the innovation loss $$\lambda \mathcal{L}_{Innovation}$$

where $\mathcal{L}_{Innovation}$ applies to any of the full losses described above (aggregated on both examples and layer neurons). The coefficient $\lambda$ is a regularization coefficient.

As mentioned above, if two layer neurons i and j are equal for all examples (or highly correlated), the loss on neuron i will push them away from each other in one direction. The loss on j will push them each to opposite directions. This can result in aggregate gradients that push neither of the neurons. To break such symmetry, the constraints on each of the neurons can be regularized with a different scale factor $\lambda_j$. Thus the imposed regularized layer loss is $$\frac{1}{n}\sum_{j=1}^{n}\lambda_j L_j.$$

If neurons are correlated scaled versions of one another, it is still possible (although very unlikely) that we will choose $\lambda_i$ and $\lambda_j$ that offset the ratio between the gradients, still resulting in a similar problem as described above. To address this, we can apply small random perturbations to each of the $\lambda_j$ values. The regularization scale factor $\lambda_j$ for the batch can consist of a fixed mean with an additional low variance (relative to the mean) 0-mean normal random variable, drawn once for each batch and each neuron j.

Innovation Instillation with Constraint Optimization

Alternatively to the regularization approach, the innovation decorrelation loss can be imposed through Lagrange constraint optimization. For each element of the constraint (e.g., for each neuron of the n neurons of the layer), we attach a dual variable $\lambda_j$, and the loss $$\mathcal{L}_{Innovation} = \frac{1}{n}\sum_{j=1}^{n}\lambda_j L_j$$

superimposed with the loss propagated down in the network, is minimized with respect to $z_j^l$, but maximized with respect to the dual variables $\lambda_j$. We can also add L2 regularization on the dual variables over a training batch.

Innovation Instillation with Minimum Description Length (MDL) Regularization-like Approach MDL regularization for linear models uses a benefit score that measures the improvement of a feature on the loss. The feature is trained without regularization, but sees all other features regularized. The benefit score is used to regularize the feature by scaling its weight down. With large benefit, almost no scaling occurs, and with a lower benefit, the feature is scaled down. A threshold $\mu$ on the benefit score can be used to completely turn down features whose benefit is below the threshold.

The mean square error computed for a neuron in the layer can act as a benefit score for an MDL regularization-like approach for the layers. Using this approach, a neuron is trained without regularization in the back-propagation algorithm. However, for performing innovation regularization, the estimated neuron uses the regularized version of all other neurons. Then, forward propagation propagates the regularized version of the neurons up the network. Backpropagation receives the gradients for the regularized versions, scales them back to the full version for backpropagation to the layer below.

Let $\beta^j$ denote the benefit score of the jth neuron of the layer. Let $\bar{z}_j$ denote the regularized version. For the first two innovation computation strategies, the full activated weight of the jth neuron is estimated from the regularized activated weights of all other neurons by $$\hat{z}_j = a_j^T \cdot \bar{z}_{-j}$$

and the error (for example l) is given by $$e_j^l = z_j^l - a_j^T \bar{z}_{-j}^l$$

The regularized weight of a neuron is given by $$\bar{z}_j^l = \sigma(\rho\beta_j + \xi) \cdot z_j^l$$

where $\rho$ and $\xi$ are parameters, and $\sigma$ denotes the Sigmoid function $$\sigma(x) = \frac{1}{1+\exp(-x)}.$$

We can set up a threshold $\mu$, such that regularize $\beta_j \leq \mu$, we regularize $\bar{z}_j$ to 0. Note that, unlike MDL with linear models, the mean, square error is lower bounded by 0, i.e., we cannot have a negative benefit score. We can therefore use the parameter $\xi$ to lower the scale factor by choosing a (highly) negative value. Alternatively, the Sigmoid function can be replaced by mother function. A possible alternative is the hyperbolic tangent, i.e., $$\bar{z}_j^l = \tanh(\rho\beta_j + \xi) \cdot z_j^l$$

where $\xi \geq 0$.

For innovation through projection, c predict the unregularized weights using regularized weights of the other neurons. This means that the matrix X uses the unregularized version of the neuron weights, while the basis matrix $B_{-j}$ is constructed with the regularized versions. The lower complexity version applies all the steps leading to $B_{-j}$ on the regularized vectors, but the last projection step is applied to the columns of X. Note that as long as we don't threshold vectors to 0, this does not make a difference, as the same scaling occurs for all examples $z_j^l$ of $x_j$. If we threshold a neuron j with $\beta_j \leq \mu$ to 0, this will set all components of $x_j$ to 0. That will exclude $x_j$ from the Gram-Schmidt process for finding $B_{-i}$ for all $i \leq j$. It thus has the potential of increasing the error for other neurons that could be predicted by the jth neuron. This generates the desired effect, where we drop neurons which add little value on other neurons, thereby increasing the benefit of the other neurons.

Let $g_j^l$ denote the gradient propagated into $\bar{z}_j^l$. Then, the gradient propagated from $\bar{z}_j^l$ to $z_j^l$, which is then connected to the layers below, is given by the chain rule by $$\frac{\partial L_j}{\partial z_j^l} = \sigma'(\rho\beta_j + \xi, \mu) \cdot g_j^l$$

where $\sigma^1(\rho\beta_j - \xi, \mu)$ denotes the clipped version of the Sigmoid, clipped to 0 for $\beta_j \leq \mu$ (assuming we use the Sigmoid).

The benefit score can be the cumulative square error on all batches and the current batch, or we can normalize it as the average per batch per example. We can also use a sliding (or a decaying exponential) window over a set of recent batches. Since in any case we sum the square error over the examples, and we do not apply a non-linear operation on the resulting mean square error, there is no difference between aggregating per-example square error or using the mean batch square error.

The initial benefit score before training starts could be set to some sufficiently large value for all neurons, to ensure they are given a chance to train. However, it is possible that random initializations, where some neurons are prioritized over the others can break symmetry, and let some neurons evolve to beneficial first, keeping the redundant neurons regularized. Setting the initial benefit to 0 for all j will stall training, as it would block any backpropagation by setting all neurons to 0.

The parameter ρ can be adjusted with the design of the benefit score. A neuron that will have low average or cumulative MSE (depending on the design choice of the benefit score) will have its weight seen by the other components of the network above the layer regularized to very small value, or to 0, if below the threshold μ. This will stop propagation of updates down the neurons connected to this neuron. However, if these neurons start diverging from their current values, they may affect other neurons in the current layer to change such that the MSE of estimating the neuron regularized away can grow again, resulting in this neuron being effective again in updates.

If a neuron becomes regularized to 0 over many batches, it is possible that the parameter presented by this neuron cannot become useful again. It may be beneficial to randomly initialize the links leading to this neuron and its bias again, so the network may be able to find a different, possibly useful, parameter for this neuron. Initialization now can be made by making the neuron orthogonal to the others on the current batch by: randomly generating batch values for the neuron; generating a linear MMSE estimator for the neuron from the other neurons with the first two strategies (or deriving an estimator from the projection strategy); subtracting the MMSE estimated values for each example in the batch from the randomly generated values, or with the projection strategy, just applying it on the neuron to find the residue; and propagating the resulting gradients to the links and bias connected. This could be done for several batches so the links below adapt to the new values.

In some implementations, the last two steps can be replaced by solving equations that satisfy the values of the neuron for the variables for the bias and the links directly connected to the neuron below, based on the activations they see below them, and assigning these solutions to warm start these links again.

For certain layers, correlated neurons that can be predicted by other neurons in the layer represent redundant parameters that add no predictive value to the network. This can also include parameters representing features that are not helpful for prediction. This conceptually implies that the innovation of a neuron can have a meaning of benefit score. While in some cases such a benefit score resembles the role of the MDL regularization one, the correlation dimension captures somewhat more than the regular MDL score. It also captures correlations between features. For the top hidden layer which connects to an output loss, it is possible that utilizing a loss driven benefit score, like the one used in linear models with MDL, can add another dimension of noise reduction improvement to the neural network.

The MDL approach can potentially eliminate bad neurons faster than a gradient based regularization approach that would require iterations of propagation of the gradients until a neuron is regularized away if it is not useful. If that happens, it could generalize better and eliminate overfitting better.

As already mentioned, the Sigmoid function for scaling the neuron weight as function of the innovation benefit score is only one option. While it is a reasonable one for MDL regularization with linear models as it renders the benefit score as a log-odds that the feature is beneficial for the model, here, the notion of probability is a little more detached from the measure computed. It is possible that other monotone scale functions with target in [0, 1] may be better here beyond the hyperbolic tangent already mentioned.

The benefit score of an MDL-like approach ties directly to the objective we attempt to maximize. The larger the objective (the more innovative the neuron is), the larger its benefit. By not inverting the innovation, we also do not have different behaviors whether we average the square error or the objective over the batch.

An additional advantage of the MDL regularization driven strategy is that we don't directly impose a loss on the network. The network trains as it would without an extra loss, with the exception of the regularization effect on the regularized neuron itself. Innovation is only used to regularize the neuron in question, not affecting other neurons. This can prevent biases that can be formed by unnatural regularization (as we have already seen for MDL regularization vs. $L_1$ approaches). It can also avoid problems like those described for two equal neurons, whose innovation objectives can negate one another, because the constraint on one neuron affects the others too.

Practical Constraints and Mini-Batching

Computing the innovation of the neurons of a layer can be too computationally intensive with any of the strategies proposed for a given batch. The computational complexity is $O(kn^2)$ or larger. If a layer consists of thousands of neurons, and a batch of examples consists of thousands of examples, such complexity is infeasible. To address that, we can use mini-batches in either or both dimensions. Examples can be mini-batched into smaller batches (although, in order for the dimensionality requirements to be satisfied, those batches should be greater than the number of neurons in the batch). We can also partition the neurons in the layer into multiple batches, and compute correlation losses over the smaller mini-batches of layer neurons. The two methods can also be combined.

Mini-batching the neurons will partition the layer into sets that are forced to be uncorrelated, while correlation among neurons from different sets may still exist. This is not ideal, but can be avoided (at least partially) by shuffling the mini-batch partitions between different batches, either periodically or randomly. Random shuffling will ensure that in average the innovation constraints are applied uniformly over the subsets of layer neurons. Mini-batching to relatively smaller subsets of layer neurons and shuffling the partitioning between full batches will substantially reduce complexity and make this approach feasible even with large layers.

Example Use on Neural Network that Includes an Ensemble of Towers

Figure 2A:
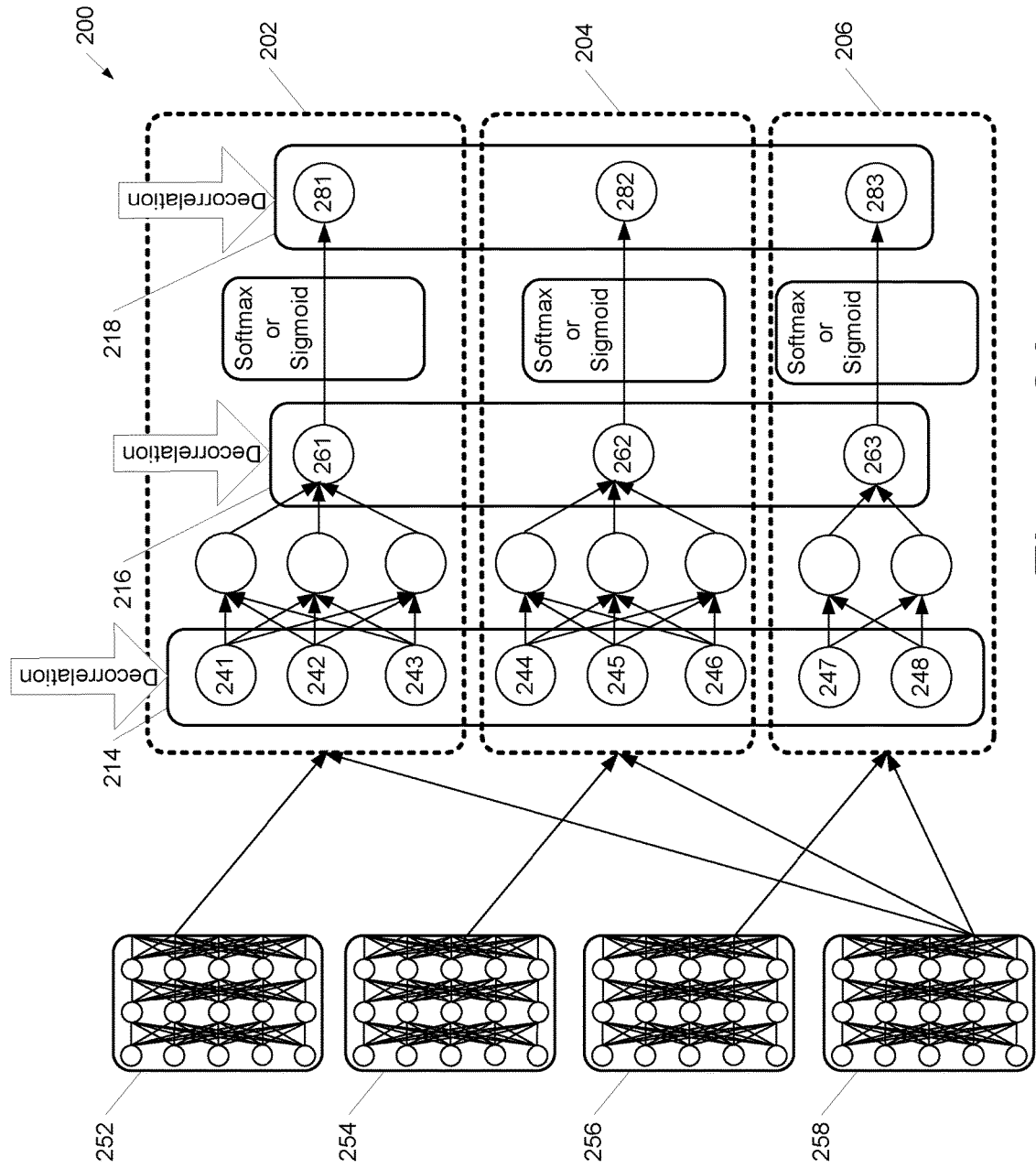

One example application of the techniques described herein is to a neural network that includes an ensemble of separate towers (e.g., separate networks that narrow down from input to output). In particular, as one example, FIG. 2A illustrates a neural network 200 that includes an ensemble of towers, including towers 202, 204, and 206. Three towers are illustrated for purpose of explanation, but networks can include any number of separate towers.

In some implementations, each tower 202, 204, 206 can receive tower-specific inputs which may come from earlier tower-specific portions of the network 200. For example, tower 202 receives a tower-specific input from portion 252 of network 200; tower 204 receives a tower-specific input from portion 254 of network 200; and tower 206 receives a tower-specific input from portion 256 of network 200. Alternatively or additionally, each tower 202, 204, 206 can receive shared inputs which may come from earlier portions of the network 200. For example, each of towers 202, 204, and 206 receive a shared input from portion 258 of the network 200.

The neural network 200 includes neurons organized into a plurality of layers. As examples, the layers include an output layer 218, and a plurality of hidden layers such as hidden layers 214 and 216. Hidden layer 216 is shown positioned prior to a set of softmax or Sigmoid operations and, as such, may in some instances be referred to as a logits layer. As illustrated in layers 214 and 216, in some instances, neurons can be in the same layer but within different towers (e.g., neurons 241 and 244 are both in layer 214 but are in separate towers 202 and 204, respectively).

In some example applications of the techniques described herein, neurons or other parameters included in one tower can be decorrelated relative to neurons included in the other towers. The decorrelation can be applied at a hidden layer (e.g., 214 or 216) or the output layer 218.

In some implementations, the decorrelation techniques can be performed by including in a loss function an innovation loss term that provides, for each neuron included in one of the towers, a loss value that is based on an ability of the neurons in the other towers, but not the other neurons in its own tower, to predict the value of such neuron. Subsequent descriptions will refer to decorrelation as any loss that forces neurons to innovate on other neurons, such as, but not limited to, decorrelation or any of the innovation losses described earlier.

As one example, neuron 241 can be decorrelated with neurons 244-248. Further, in some implementations, decorrelation techniques are not applied to decorrelate neuron 241 from neurons 242 or 243. Thus, an innovation loss can be applied to neuron 241 which provides, for neuron 241, a loss value that is based on an ability of the neurons 244-248 in the other towers 204, 206, but not the other neurons 242, 243 in its own tower 202, to predict the value of neuron 241. The innovation loss can be respectively applied to some of all of the neurons 241-248.

Similarly, the neurons in layers 216 and 218 can be decorrelated from the other neurons in the other towers in the same layer. As an example, neuron 262 can be decorrelated from neurons 261 and 263. As yet another example, output 283 can be decorrelated from outputs 281 and 282. Thus, decorrelation can be applied before the softmax or Sigmoid operations (e.g., at layers 214 and/or 216) and/or decorrelation can be applied after the softmax or Sigmoid operations (e.g., at layer 218). If labels are binary, softmax can be replaced by the Sigmoid function. Otherwise, in some implementations, decorrelation on softmax can be applied on each of the label values of the softmax, (e.g., if there are 4 different label values, decorrelation can be done between the neurons for each of the 4. It can also be done for 3 out of the 4, where the 4th label softmax value is given from the other 3).

Thus, decorrelation can be applied at one or more different layers of the network 200 including a hidden layer such as 214, a logits layer such as 216, and/or an output layer such as 218.

FIG. 2B shows another example neural network 300. Neural network 300 is highly similar to network 200 of FIG. 2A, except that in network 300 of FIG. 2B, the neurons 261, 262, and 263 of towers 202, 204, and 206 are combined into a single, shared neuron 302 prior to a softmax or Sigmoid layer 306 which generates an output 304. The neurons of layers 214 and/or 216 can be decorrelated according to the decorrelation techniques described herein. Thus, in some examples, decorrelation can be performed prior to combination of the towers into one or more shared neurons (e.g., shared neuron 302) As illustrated in FIG. 2B, combination of the towers 202, 204, 206 into the shared neuron 302 can occur prior to the softmax layer 306. In some examples, combination of the neurons can be applied as a sum, mean, gated mixture of experts, or other forms.

Figure 2C:
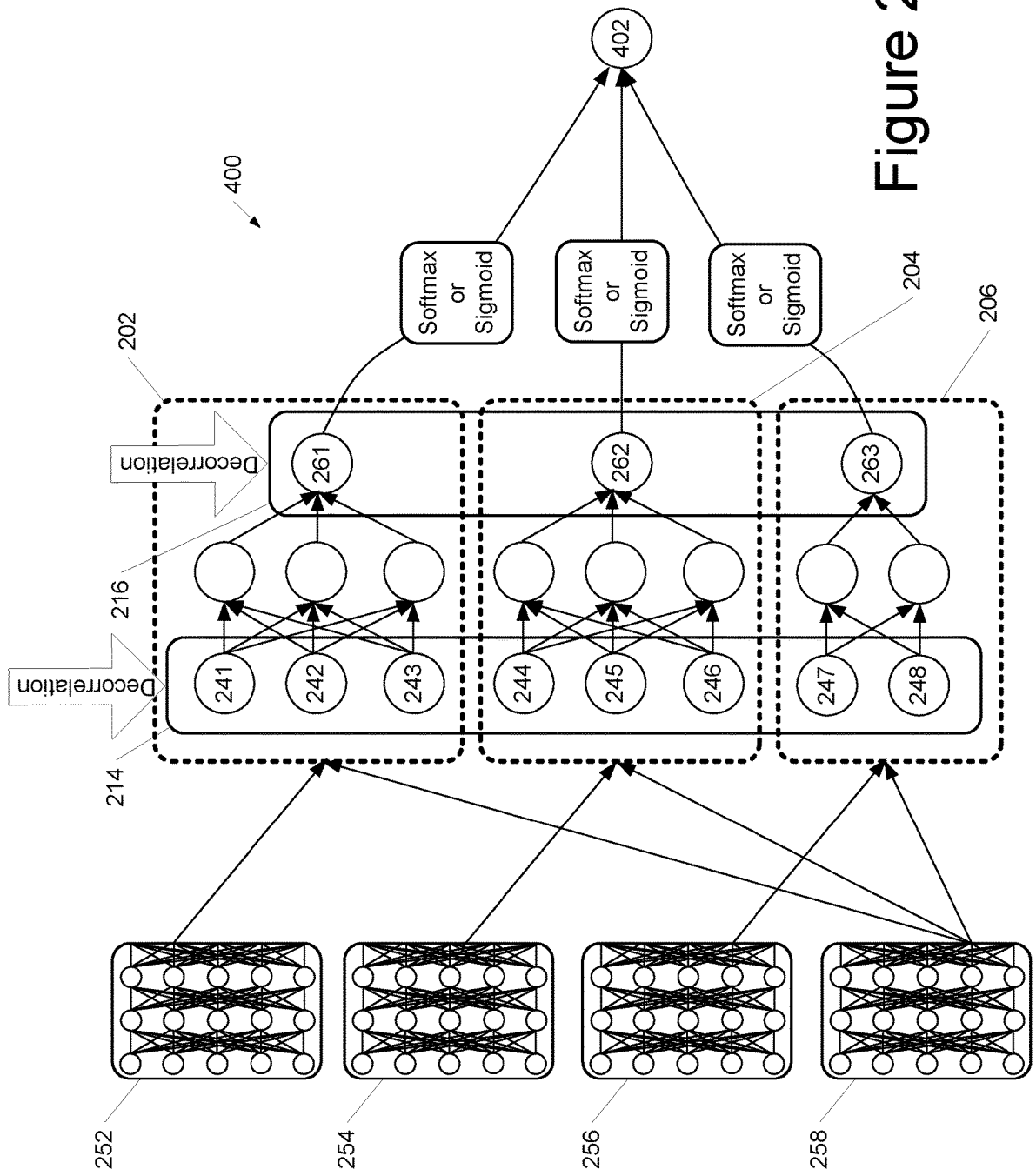

FIG. 2C shows another example neural network 400. Neural network 400 is similar to network 300 of FIG. 2B, except that in network 400 of FIG. 2C, the neurons 261, 262, and 263 of towers 202, 204, and 206 are combined into a single, shared output 402 after softmax operations. Thus, as illustrated in FIG. 2C, combination of the towers 202, 204, 206 into the shared neuron 402 can occur after the softmax operations.

Thus, network 400 of FIG. 2C is similar to network 200 of FIG. 2A, but ensembles the outputs into a single output 402. In the network 200 of FIG. 2A, this ensembling of outputs is not necessarily (but can be) performed, but they may still be decorrelated.

Referring again to FIG. 2A, according to another aspect, during training, the values of input embeddings to the network 200 may be initialized to values other than zero. For example, the values of inputs to portions 252, 254, 256, and/or 258 can be initialized to non-zero values. In particular, in some implementations, the values of the inputs may be initialized to random values. Initializing the values of the inputs to be non-zero can assist in the decorrelation techniques described herein because they can provide an initial amount of decorrelation that can be increased during training. In some implementations, embedding values may be initialized non-randomly to non-zero values, or to values which are transferred from previously trained models.

Example Devices and Systems

FIG. 1A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The model trainer 160 can perform any of the decorrelation techniques described herein.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
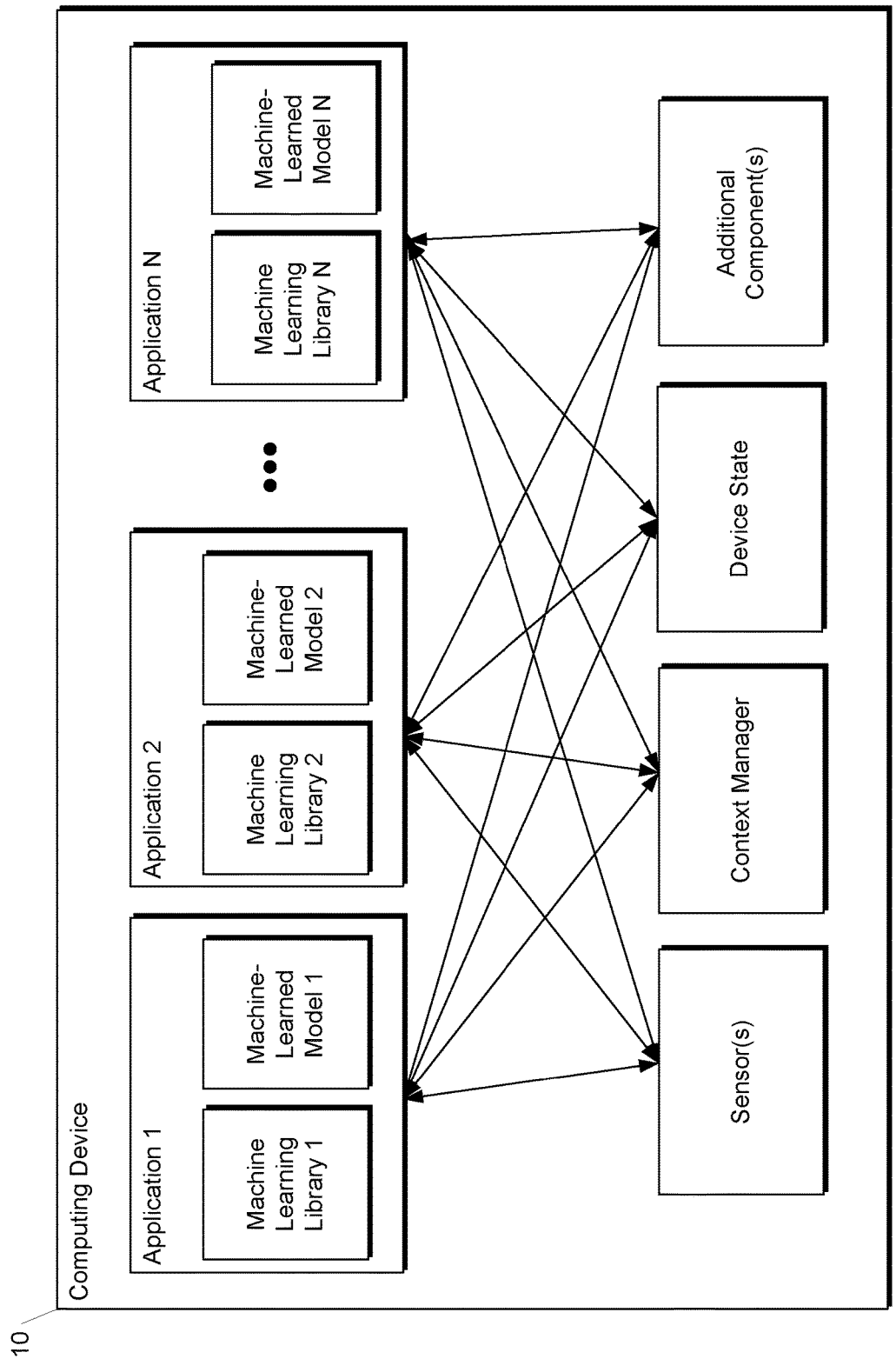
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
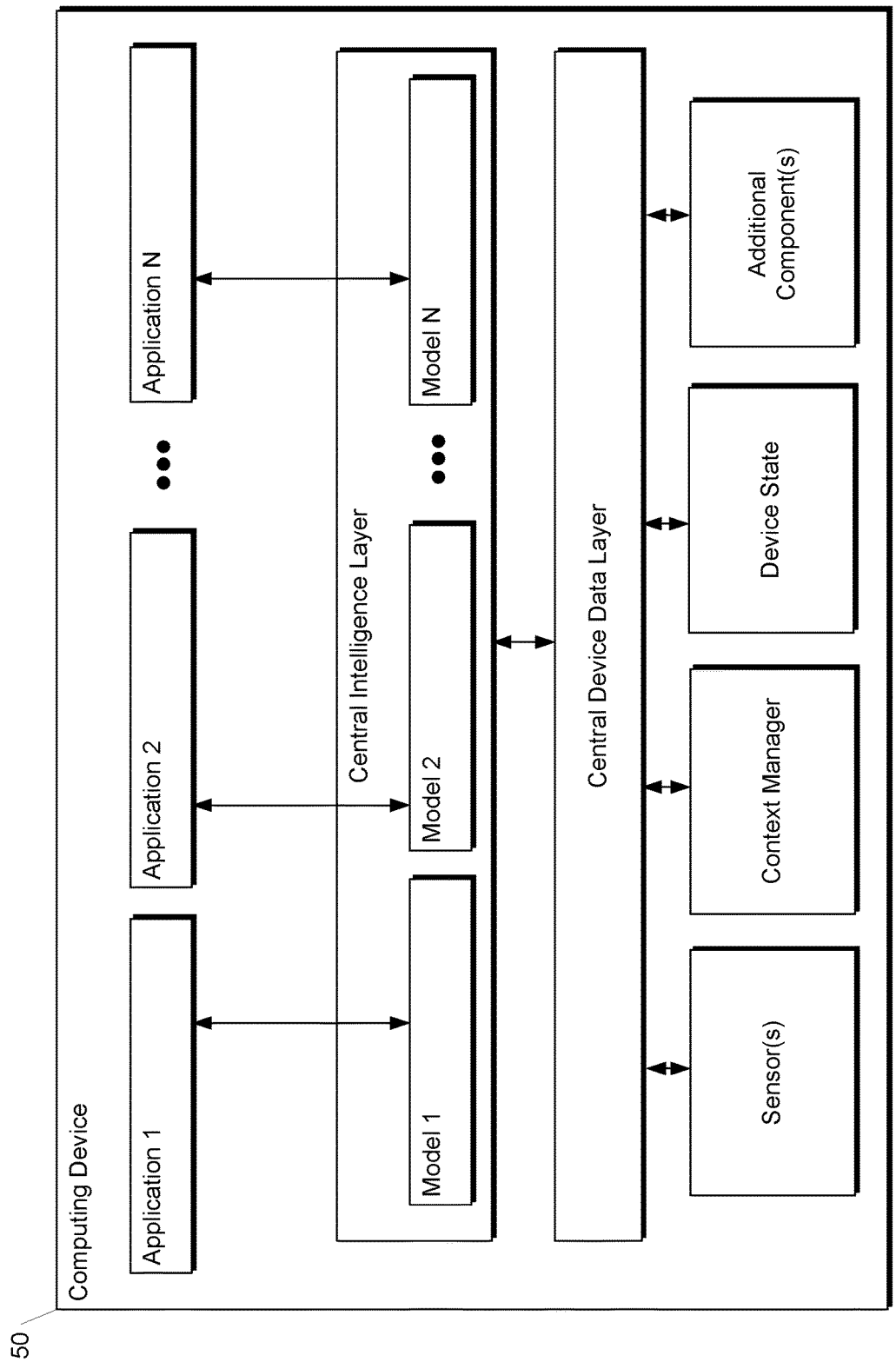
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to train neural networks, the method comprising:

obtaining, by one or more computing devices, data descriptive of a neural network, the neural network comprising a plurality of layers of neurons; and backpropagating, by the one or more computing devices, a loss function through the neural network to train the neural network, wherein the loss function is descriptive of a performance of the neural network with respect to a set of training examples, and wherein backpropagating, by the one or more computing devices, the loss function through the neural network comprises, for each of one or more layers of the plurality of layers of the neural network:

determining, by the one or more computing devices, a gradient of the loss function with respect to the neurons included in the layer, wherein, for at least the layer, the loss function includes an innovation loss term that provides, for each of one or more neurons included in the layer, a loss value that is based on an ability of one or more other neurons in the layer to predict a value of such neuron; and modifying, by the one or more computing devices, the neurons included in the layer based at least in part on the gradient of the loss function that includes the innovation loss term to decorrelate the neurons included in the layer.

2. The computer-implemented method of claim 1, wherein at least one of the one or more layers comprises respective portions of two or more separate towers of the neural network, and wherein the innovation loss term provides, for at least one neuron included in one of the towers, a loss value that is based on an ability of the neurons in the other towers, but not the other neurons in its own tower, to predict the value of such neuron.

3. The computer-implemented method of claim 1, wherein the one or more layers of the neural network comprise one or more hidden layers of the neural network.

4. The computer-implemented method of claim 1, wherein, for each of the one or more neurons included in the layer, the innovation loss term pushes the gradient over such neuron to increase its innovation over the one or more other neurons included in the layer.

5. The computer-implemented method of claim 1, wherein, for each of the one or more neurons included in the layer, the loss value provided by the innovation loss term is negatively correlated to an error of a prediction of the value of such neuron by the one or more other neurons included in the layer.

6. The computer-implemented method of claim 5, wherein, for each of the one or more neurons included in the layer, the error of the prediction of the value of such neuron by the one or more other neurons included in the layer comprises an error associated with a linear Minimum Mean Square Error estimator.

7. The computer-implemented method of claim 6, wherein, for each of the one or more neurons included in the layer, the linear Minimum Mean Square Error estimator comprises at least one of:
an average batch error computed over a batch of training examples;
an expected Mean Square Error computed directly from estimated correlations within the layer.

8. The computer-implemented method of claim 6, wherein, for each of the one or more layers, the innovation loss term provides the loss value based at least in part on an average of the linear Minimum Mean Square estimators for all neurons included in the layer.

9. The computer-implemented method of claim 6, wherein, for each of the one or more neurons included in the layer, the innovation loss term decays with respect to a square root of the linear Minimum Mean Square Error estimator for such neuron.

10. The computer-implemented method of claim 5, wherein, for each of the one or more neurons included in the layer, the innovation loss term provides the loss value based at least in part on an inversion of the error of the prediction.

11. The computer-implemented method of claim 5, wherein, for each of the one or more neurons included in the layer, the error of the prediction of the value of such neuron by the one or more other neurons included in the layer is at least one of:
determined by solving a linear least squares regression problem with respect to the one or more other neurons included in the layer; and
a gradient descent regression estimator.

12. The computer-implemented method of claim 5, wherein, for each of the one or more neurons included in the layer, the error of the prediction of the value of such neuron by the one or more other neurons included in the layer is determined by performing parallel Gram-Schmidt orthogonalization on neuron example vectors and computing a residue for a last vector.

13. The computer-implemented method of claim 5, wherein, for each of the one or more neurons included in the layer, the error of the prediction of the value of such neuron by the one or more other neurons included in the layer comprises an error of projecting a column vector representing the value of the neuron on a space spanned by one or more basis matrices that comprise one or more basis vectors.

14. The computer-implemented method of claim 5, wherein, for each of the one or more neurons included in the layer, a square norm of a projection of the prediction of the value of such neuron by basis vectors spanned from the one or more other neurons included in the layer comprises an additional loss for instilling innovation.

15. The computer-implemented method of claim 1, wherein the innovation loss term comprises a regularization term that is added to a primary loss according to a scaling factor.

16. The computer-implemented method of claim 1, wherein, for each of the one or more layers, the loss function includes a per-neuron regularization scaling factor that prevents symmetry of constraints on the neurons.

17. The computer-implemented method of claim 1, wherein, modifying, by the one or more computing devices, the neurons included in the layer based at least in part on the gradient of the loss function comprises imposing, by the one or more computing devices, the innovation loss term through Lagrange constraint optimization.

18. The computer-implemented method of claim 1, wherein, for each of the one or more layers, the innovation loss term is applied post-activation of the neurons included in the layer.

19. A computer system to train neural networks, the computer system comprising:
one or more processors; and
one or more non-transitory computer-readable media that store instructions that, when executed by the one or more processors, cause the computer system to perform operations, the operations comprising:
obtaining data descriptive of a neural network, the neural network comprising a plurality of layers of neurons; and
determining for each of one or more neurons included in one or more of the plurality of layers, a benefit score based at least in part on an error of a prediction of a value of such neuron by one or more other neurons included in a same layer; and
modifying a weight associated with at least one of the one or more neurons based at least in part on the benefit score determined for such at least one neuron.

20. The computing system of claim 19, wherein modifying the weight associated with at least one of the one or more neurons based at least in part on the benefit score comprises regularizing the weight to zero when the error is less than a threshold value.

21. One or more non-transitory computer-readable media that store instructions that, when executed by one or more processors, cause the one or more processors to perform operations, the operations comprising:
obtaining data descriptive of a neural network, the neural network comprising a plurality neurons respectively connected by a plurality of links; and
backpropagating a loss function through the neural network to train the neural network, wherein the loss function is descriptive of a performance of the neural network with respect to a set of training examples, and wherein backpropagating the loss function through the neural network comprises, for each of one or more neurons, links, or biases of the neural network:
determining a gradient of the loss function with respect to the one or more neurons, links, or biases of the neural network, wherein, for at least the one or more neurons, links, or biases of the neural network, the loss function includes an innovation loss term that provides, for each of the one or more neurons, links, or biases, a loss value that is based on an ability of one or more other neurons, links, or biases to predict a value of such neuron, link, or bias; and modifying the one or more neurons, links, or biases of the neural network based at least in part on the gradient of the loss function that includes the innovation loss term to decorrelate the one or more neurons, links, or biases of the neural network.

* * * * *